United States Patent
Fujii et al.

(10) Patent No.: US 6,795,391 B2
(45) Date of Patent: Sep. 21, 2004

(54) RECORDING MEDIUM CARTRIDGE

(75) Inventors: Akihiko Fujii, Kanagawa-ken (JP); Kiyoo Morita, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 123 days.

(21) Appl. No.: 10/145,756

(22) Filed: May 16, 2002

(65) Prior Publication Data

US 2002/0172141 A1 Nov. 21, 2002

(30) Foreign Application Priority Data

May 17, 2001 (JP) .......................................... 2001-147965

(51) Int. Cl.$^7$ ................................................ G11B 7/26
(52) U.S. Cl. ..................................................... 369/291
(58) Field of Search ......................... 369/291; 360/132, 360/133; 206/308.1; 428/35.7; 430/34.1

(56) References Cited

U.S. PATENT DOCUMENTS

| | | | | |
|---|---|---|---|---|
| 5,317,467 A | * | 5/1994 | Kato et al. | 360/133 |
| 5,796,713 A | * | 8/1998 | Tanaka | 369/291 |
| 5,815,487 A | * | 9/1998 | Fujisawa | 369/291 |
| 6,542,459 B2 | * | 4/2003 | Miyazaki et al. | 369/291 |
| 2001/0014079 A1 | * | 8/2001 | Kikuchi et al. | 369/291 |

FOREIGN PATENT DOCUMENTS

| | | | | | |
|---|---|---|---|---|---|
| JP | 02218079 A | * | 8/1990 | | G11B/23/04 |
| JP | 06020431 A | * | 1/1994 | | G11B/23/03 |
| JP | 2001-250364 | | 9/2001 | | |

* cited by examiner

Primary Examiner—William Korzuch
Assistant Examiner—Mark Blouin
(74) Attorney, Agent, or Firm—Sughrue Mion, PLLC

(57) ABSTRACT

A recording medium cartridge equipped with a resin cartridge case housing a recording medium. The resin cartridge case contains titanium dioxide by 0.1 to 1.2 wt %, preferably by 0.15 to 0.8 wt %.

4 Claims, 1 Drawing Sheet

RECORDING MEDIUM CARTRIDGE

BACKGROUND OF THE INVENTION

1. Field of the Invention

The present invention relates to a recording medium cartridge in which a recording medium is housed within a cartridge case, and more particularly to the material of the cartridge case.

2. Description of the Related Art

As examples of recording medium cartridges, in which a commercially-available recording medium such as a magnetic recording medium and an optical recording medium is housed within a cartridge case, there are a magnetic disk cartridge housing a magnetic disk (such as a flexible disk, a magneto-optical disk, etc.), a magnetic tape cartridge housing magnetic tape (such as VTR tape, tape for external storage units for computers, etc.), and an optical disk cartridge housing an optical disk. The cartridge cases for these recording medium cartridges are normally formed by molding resin.

These recording medium cartridges are conveyed to a recording/reproducing unit by manual operation, and recording or reproducing is performed. In addition, a large number of recording medium cartridges are achieved in a library, and under computer control, a predetermined recording medium cartridge is automatically taken out. The recording medium cartridge is conveyed to a recording/reproducing unit, in which recording or reproducing is performed. After use, the recording medium cartridge is automatically conveyed and archived in the library. In such an automatic system, it is necessary to detect a recording medium cartridge. It is possible to use a mechanical sensor to detect a recording medium cartridge. However, it is preferable that a recording medium cartridge be detected with non-contact by an optical sensor such as an infrared sensor, etc.

In addition, in recording medium cartridges, recording mediums with recording capacity enhanced by an improvement in recording density are housed in cartridge cases of the same shape. They are used, while interchangeability is being assured. To discriminate between the previous and new cartridges, the color of the cartridge case is often changed.

In the case where a cartridge case is molded with resin, there is a need to take shock strength, and moldability into consideration. In addition, to reliably perform non-contact detection by the aforementioned infrared sensor, it is necessary that an infrared transmissivity for a cartridge case be, for example, 5% or less.

However, in the case where the color of a cartridge case is changed as mentioned previously, the aforementioned shock strength, and moldability will be conflicting elements, if the cartridge case is colored in a bright color such as blue, yellow, etc. Thus, there are cases where it becomes difficult to satisfy both requirements.

SUMMARY OF THE INVENTION

The present invention has been made in view of the circumstances mentioned above. Accordingly, it is the primary object of the present invention to provide a recording medium cartridge that is capable of having appropriate infrared transmissivity, while assuring stock strength, frame resistance, and moldability, when changing the color of a resin cartridge case housing a recording medium.

To achieve this end, there is provided a recording medium cartridge comprising a resin cartridge case housing a recording medium. The resin cartridge case contains titanium dioxide by 0.1 to 1.2 wt %.

The resin cartridge case may be composed of polycarbonate resin, fiber-reinforced polycarbonate resin, an alloy resin of polycarbonate and acrylonitrile butadiene styrene copolymer (ABS), ABS resin, polystyrene resin, etc. Particularly, polycarbonate resin is preferred.

The amount of titanium dioxide added is 0.1 to 1.2 wt %, preferably 0.1 to 1.0 wt %, and further preferably 0.15 to 0.8 wt %.

According to the present invention, the resin of the resin cartridge case contains titanium dioxide by 0.1 to 1.2 wt %. As a result, the color of the cartridge case can be changed to a bright color such as blue, yellow, etc., while assuring shock strength, moldability, and infrared transmissivity.

To reduce infrared transmissivity to about 5% or less and obtain stable detection by an infrared sensor, it is necessary that the addition of titanium dioxide be 0.1 wt % or greater, preferably 0.15 wt %.

On the other hand, the cartridge case of the recording medium cartridge is normally required to have a shock strength which can resist shock due to a fall from a height of 0.7 to 1 m. To assure moldability in addition to the stock strength, it is necessary that the amount of titanium dioxide added be 1.2 wt % or less, preferably 1.0 wt % or less, and further preferably 0.8 wt % or less. That is, titanium dioxide plays a catalytic role and has the property of accelerating the thermal degradation of resin, for example, polycarbonate resin. Because of this, titanium dioxide reduces the molecular weight of resin and therefore reduces shock strength. In the step of molding the cartridge case, the stay of resin within a molding machine for about ten minutes cannot be avoided when the machine is started, and consequently, the thermal degradation of resin progresses. To avoid this phenomenon and assure shock strength, and to assure infrared transmissivity, it is preferable that the added amount of titanium dioxide be in the aforementioned range.

BRIEF DESCRIPTION OF THE DRAWING

The present invention will be described in further detail with reference to the accompanying drawing wherein.

DESCRIPTION OF THE PREFERRED EMBODIMENT

Figure 1:
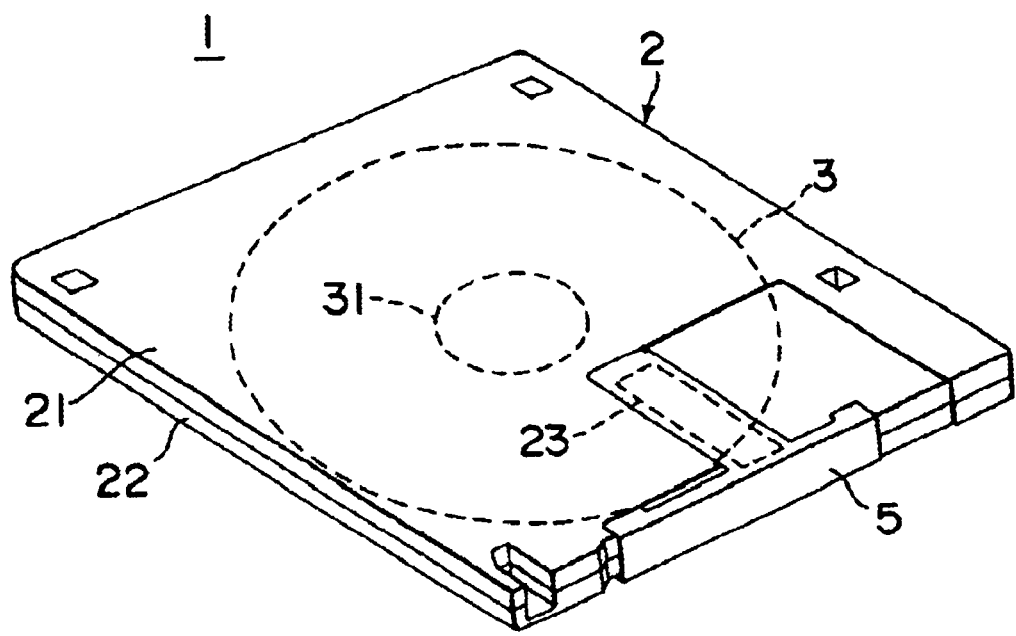
FIG. 1 is a perspective view showing a recording medium cartridge constructed according to a preferred embodiment of the present invention.

Referring to FIG. 1, there is shown a preferred embodiment of a recording medium cartridge in accordance with the present invention. The recording medium cartridge in the preferred embodiment is a magnetic disk cartridge housing a magnetic disk medium as a recording medium.

The magnetic disk cartridge 1 has a flat cartridge case 2, which consists of an upper shell 21 and a lower shell 22. The upper and lower shells 21, 22 are formed from synthetic resin. Within the cartridge case 2, a magnetic disk medium 3 with a central portion mounted on a center core 31 is housed so that it is free to rotate.

The upper shell 21 and lower shell 22 in the cartridge case 2 are approximately rectangular and flat in shape and are provided with a rectangular window 23 for insertion of a rectangular magnetic head. The center portion of the bottom surface of the lower shell 22 is formed into a spindle bore (not shown) having the size of the bottom surface of the center core 31. To open and close the window 23, a shutter member 5 is provided so that it is slidable in a direction parallel to the plane of the cartridge case 2.

The cartridge case 2 is formed from polycarbonate resin containing titanium dioxide, a predetermined coloring agent (blue, yellow, etc.), and, as needed, an addition agent. The amount of titanium dioxide added is 0.1 to 1.2 wt % (weight percent), preferably 0.1 to 1.0 wt %, and further preferably 0.15 to 0.8 wt %.

Note that the polycarbonate resin use one that has a viscosity average molecular weight of 20000±1000. This polycarbonate resin changes from ductile breaking to brittle fracture and becomes liable to break by shock due to a fall, etc., if the average molecular is reduced by pyrolysis and the viscosity average molecular weight becomes 18000 or less. Because of this, the polycarbonate resin in the preferred embodiment is molded so that it holds the aforementioned value or greater.

According to the magnetic disk cartridge 1 of the preferred embodiment, the resin cartridge case 2 contains titanium dioxide by 1 wt % or greater (preferably 0.15 wt % or greater). Because of this, infrared transmissivity in the molded cartridge case 2 becomes about 5% or less, and consequently, stable non-contact detection by an infrared sensor can be performed, for example, in an automation system for a library, etc.

In addition, the amount of titanium dioxide added is 1.2 wt % or less, preferably 1.0 wt % or less, and further preferably 0.8 wt % or less. Because of this, even if heated resin stays for about 10 minutes in the step of molding the cartridge case 2, the progress of the thermal degradation of polycarbonate resin can be prevented. Therefore, a reduction in the shock strength of the resin due to a reduction in the molecular weight is minimized, whereby satisfactory shock strength can be insured after molding. For instance, when the magnetic disk cartridge 1 with the magnetic disk medium 3 housed in the cartridge case 2 is fallen from a height of 0.7 to 1 m, there is no possibility that the breakage or deformation of the cartridge case 2 which causes operation failure in a recording/reproducing unit or damage to stored data will be caused by the falling shock. Thus, sufficient falling strength can be assured.

Furthermore, the cartridge case 2 can be colored in a bright color such as blue, yellow, etc. When the magnetic disk medium 3 with recording capacity enhanced by an improvement in recording density is housed, discrimination can be achieved.

In the preferred embodiment, the material of the cartridge case 2 uses polycarbonate resin. In the case where strong shock strength is required, it is preferable to combine polycarbonate resin with glass fibers or carbon fibers to enhance shock strength. In addition, the material of the cartridge case 2 is able to employ an alloy resin of polycarbonate and acrylonitrile butadiene styrene copolymer (ABS), ABS resin, polystyrene resin, etc. In these resins, if titanium dioxide is added 0.1 to 1.2 wt % (preferably 0.1 to 1.0 wt %, and further preferably 0.15 to 0.8 wt %), a trade-off between infrared transmissivity and shock strength is achieved.

In the preferred embodiment, while the magnetic disk cartridge 1 housing a magnetic disk medium 3 as a recording medium has been described, the present invention is also applicable to a magnetic disk cartridge housing a magnetic disk (such as a flexible disk, a magneto-optical disk, etc.), a magnetic tape cartridge housing magnetic tape (such as VTR tape, tape for external storage units for computers, etc.), and an optical disk cartridge housing an optical disk.

Particularly, in the magnetic tape cartridge, in which a single reel with external storage tape for a computer wound thereon is housed, and the magnetic tape cartridge, in which VTR tape is housed, if the amount of tape housed becomes longer, the weight is increased and shock strength becomes an important consideration. Because of this, if a small amount of titanium dioxide (0.1 to 0.8 wt %) is added to resin having high shock strength (for example, fiber-reinforced polycarbonate resin, etc.), satisfactory results are obtained.

While the present invention has been described with reference to the preferred embodiment thereof, the invention is not to be limited to the details given herein, but may be modified within the scope of the invention hereinafter claimed.

What is claimed is:

1. A recording medium cartridge comprising:
   a resin cartridge case, and
   a recording medium housed in said cartridge case, wherein said resin cartridge case contains titanium dioxide by 0.1 to 1.2 wt %.

2. A recording medium cartridge as set forth in claim 1, wherein said resin cartridge case contain titanium dioxide by 0.1 to 1.0 wt %.

3. A recording medium cartridge as set forth in claim 1, wherein said resin cartridge case contain titanium dioxide by 0.15 to 0.8 wt %.

4. The recording medium cartridge as set forth in claim 1, wherein said cartridge case is composed of a resin selected from a group consisting of polycarbonate resin, fiber-reinforced polycarbonate resin, an alloy resin of polycarbonate and acrylonitrile butadiene styrene copolymer (ABS), ABS resin, and polystyrene resin.

* * * * *